United States Patent

Henniger

[11] Patent Number: 5,350,204
[45] Date of Patent: Sep. 27, 1994

[54] SCREW COUPLING

[75] Inventor: Dieter Henniger, Schalksmühle, Fed. Rep. of Germany

[73] Assignee: Hermann Kleinhuis GmbH & Co. KG, Ludenscheid, Fed. Rep. of Germany

[21] Appl. No.: 96,774

[22] Filed: Jul. 23, 1993

[51] Int. Cl.$^5$ ............................................. F16L 5/00
[52] U.S. Cl. ................................... 285/323; 285/158; 174/65 SS
[58] Field of Search ................. 285/322, 323, 92, 158; 174/65 SS

[56] References Cited

U.S. PATENT DOCUMENTS

| | | | |
|---|---|---|---|
| 3,311,391 | 3/1967 | Harrell | 285/323 X |
| 4,145,075 | 3/1979 | Holzmann | 285/322 X |
| 4,250,348 | 2/1981 | Kitagawa | 285/322 X |
| 4,787,657 | 11/1988 | Henniger | 285/323 |
| 5,048,872 | 9/1991 | Gehring | 285/322 X |

FOREIGN PATENT DOCUMENTS

| | | |
|---|---|---|
| 2132951 | 9/1977 | Fed. Rep. of Germany . |
| 2631996 | 3/1984 | Fed. Rep. of Germany . |
| 8415525 | 10/1984 | Fed. Rep. of Germany . |
| 4200549 | 5/1993 | Fed. Rep. of Germany ......... H02G 3/06 |

Primary Examiner—Dave W. Arola
Attorney, Agent, or Firm—Darby & Darby

[57] ABSTRACT

A screw coupling whose constituents are made of a plastic material and which comprises a nipple having an externally threaded section and flexible prongs extending from one end of the externally threaded section. The coupling further comprises a nut which can be rotated to move into mesh with the externally threaded section and to thereby deform the prongs toward the axis of the nipple and hence toward the external surface of a cable, a hose or another body which extends through aligned axial passages of the nipple and nut. Each prong has an elongated wedge-like main portion and a clamping portion which is fast with the free end of the main portion and extends from the main portion in the direction of rotation of the nut to move it into mesh with the externally threaded section. The clamping portions overlie the main portions of the neighboring prongs. The main portions of neighboring prongs are separated from each other by wedge-like slots. It is presently preferred to employ a set of identical prongs.

13 Claims, 3 Drawing Sheets

SCREW COUPLING

BACKGROUND OF THE INVENTION

The invention relates to improvements in screw couplings of the type disclosed in commonly owned U.S. Pat. No. 4,787,657 granted Nov. 29, 1988 to Dieter Henniger for "Screw Coupling". The disclosure of this patent is incorporated herein by reference. Henniger discloses a screw coupling wherein a cable, hose or a like part can be engaged by a set of prongs or tongues each having a relatively wide clamping portion extending to both sides of an axially extending web which serves to connect the clamping portion with an externally threaded portion of a nipple. The width of the clamping portions exceeds the width of the respective web, as seen in the circumferential direction of the externally threaded portion. Furthermore, the clamping portions of neighboring prongs overlie each other in the axial direction but not in the circumferential direction of the externally threaded portion. The prongs are separated from each other by slots or gaps the width of which increases in a direction away from the internally threaded section. An advantage of the patented coupling is that the clamping portions of its prongs have ample room to conform to the outline of a cable, hose or a like part while a nut is rotated to move its internal thread into mesh with the externally threaded section of a nipple including the prongs and the externally threaded section. This renders it possible to properly clamp cables, hoses or like parts having large or small diameters. Another advantage of the patented coupling is that the neighboring prongs can move relative to each other while they are being subjected to the deforming action of the nut; this ensures that each prong can adequately engage a hose, a cable or a like part without interfering with the radially inward movement of the clamping portion on the adjacent prong. This, in turn, ensures that a cable, a hose or a like part can be adequately engaged by all of the clamping portions, e.g., to establish an adequate sealing or locking action (i.e., to prevent axial movements of the patented coupling and a hose or cable relative to each other). An additional advantage of the patented coupling is that the clamping portion of each prong can be moved into large-area contact with the external surface of a cable, a hose or a like object to thus further reduce the likelihood of axial movement of the coupling and a cable or the like relative to each other and to enhance the likelihood of establishing a reliable seal between the deformed (radially inwardly flexed) portions of the prongs and the external surface of an object which is surrounded by such portions of the coupling.

The coupling of Henniger is designed in such a way that each coupling portion extends to both sides of the respective main portion. As a rule, the patented coupling is designed to ensure that the length of each clamping portion in the direction of rotation of the coupling to deform the prongs equals or at least approximates the extent to which each clamping portion projects in the opposite direction.

German Pat. No. 21 32 951 discloses a sealing sleeve which can be installed in a wall or the like and is provided with an external thread serving to mate with the internal thread of a nut to thereby deform a plastic tubular sealing element into engagement with the external surface of a hose, cable or a like part which extends through the nut, through the sealing element and through the sleeve. The sealing element is provided with axially parallel slots and is intended to establish a fluidtight (i.e., liquid-proof as well as gas-proof) connection between the patented device and the external surface of a cable, hose or the like. The slots in the sealing element are straight and extend substantially tangentially of the internal surface of such element. The prongs of the sealing element overlap each other, not unlike the sections of a fan, in the circumferential direction of the sleeve when the nut is applied to subject the sealing element to a requisite sealing action.

German Pat. No. 26 31 996 discloses a plastic screw coupling wherein the prongs are provided with tooth-shaped sections and partially overlap each other when the internally threaded nut is applied to subject the prongs to a deforming action. The patented coupling is further provided with means for preventing accidental loosening of the nut, namely a toothed gear in the nut which is caused to mate with the tooth-shaped sections of the prongs. The internal surface of the nut is provided with an inclined internal thread which acts upon the free ends of the prongs in a sense to apply a force which acts upon successive tongues radially inwardly, i.e., toward the hose, cable or a like object which is surrounded by the patented coupling. This causes the tongues to partially overlap each other in the applied condition of the coupling, and the internal saw teeth of the nut then mate with the external saw teeth of the deformed prongs in order to prevent unintentional loosening of the nut.

German Utility Model No. 84 15 525 discloses a screw coupling which can be applied to cables hoses or like objects and wherein the prongs together form a ring. At least one of the prongs is configured in such a way that it is driven toward the axis of the clamped object when a nut (which serves to deform the prongs) is applied. Thus, the at least one prong is moved out of the ring toward the center of the ring. In other words, all of the prongs no longer form a ring. The distribution of neighboring prongs in the coupling of the Utility Model is such that the at least one prong is acted upon by a cam face or ramp at its front and rear sides (as seen in the circumferential direction of the nut); such ramps compel the at least one prong to move out of the ring and toward the axis of the clamped object. The just described coupling can engage the surrounded object with a considerable force; however, the sealing action is unsatisfactory or nil.

OBJECTS OF THE INVENTION

An object of the invention is to provide a screw coupling which constitutes an improvement over and a further development of screw couplings of the type disclosed in U.S. Pat. No. 4,787,657 to Henniger.

Another object of the invention is to provide a screw coupling which exhibits all advantages but does not exhibit the drawbacks of the screw coupling of Henniger.

A further object of the invention is to provide a simple and inexpensive screw coupling which may but need not utilize a tubular sealing element in order to establish a reliable sealing action between the prongs and the external surface of a cable, a hose, a conductor or a like part which is to be sealingly engaged and/or held against axial movement.

An additional object of the invention is to provide a novel and improved nipple for use in the above outlined screw coupling.

Still another object of the invention is to provide the nipple with novel and improved prongs.

A further object of the invention is to provide a novel and improved method of orienting the prongs of the nipple.

Another object of the invention is to provide a screw coupling wherein the prongs of the nipple can be moved into large-area contact with the external surface of an object which is to be clamped and/or sealingly engaged by the prongs.

An additional object of the invention is to provide a screw coupling which can be applied to large-diameter, medium-diameter or small-diameter cables, hoses or like parts.

Still another object of the invention is to provide a novel and improved combination of a cable, hose or an analogous object and a screw coupling of the above outlined character.

A further object of the invention is to provide a screw coupling wherein all of the discrete parts can be made of one and the same material.

Another object of the invention is to provide a screw coupling which can be applied or removed by resorting to simple and readily available tools.

SUMMARY OF THE INVENTION

The invention is embodied in a screw coupling which can be used with particular advantage to surround cables, hoses, conduits, conductors and like bodies. The improved coupling comprises a substantially tubular nipple including an externally threaded first annular section and a second annular section fast and coaxial with the first section. The second section includes a plurality of neighboring flexible prongs which extend in substantial parallelism with the common axis of the two sections and are separated from each other by slots of the second section, and the coupling further comprises a nut having an internal thread movable into mesh with the first section of the nipple in response to rotation of the nut in a predetermined direction to thereby deform at least a portion of each prong from a starting position toward the common axis of the two sections. The prongs have clamping portions which extend in the predetermined direction and the clamping portions of neighboring prongs at least partly overlie such neighboring prongs in the starting positions of the prongs. The nipple and/or the nut can contain (e.g., can be made of) a plastic material. The coupling can further comprise a substantially tubular sealing element which is insertable into the second section of the nipple and is deformable by the prongs in response to rotation of the nut while the internal thread of the nut mates with the first section of the nipple. The second section of the nipple has an end face which is remote from the first section (as seen in the direction of the common axis of the first and second sections) and the width of the prongs preferably decreases from the first section toward the end face whereas the width of the slots increases from the first section toward the end face (as seen in the direction of the common axis of the two sections of the nipple). Each of the prongs preferably further includes a main portion which can extend in substantial parallelism with the common axis in the starting position of the respective prong. The clamping portions are preferably of one piece with and extend from the respective main portions substantially circumferentially of the nipple at locations which are remote from the first section.

The clamping portions can extend from the main portions of the respective prongs in the predetermined direction of rotation of the nut in order to bring the thread of the nut into mesh with the externally threaded first section of the nipple.

The configuration of the second section of the nipple can be such that the internal surfaces of the clamping portions confront the common axis and touch a common circle in the starting positions of the prongs.

The clamping portions are fast with and extend in the predetermined direction from the main portions of the respective prongs, and each clamping portion can overlie the main portion of neighboring prong, at least in the starting positions of the prongs. The external surfaces of the clamping portions of the prongs face away from the common axis of the first and second sections of the nipple, and such external surfaces preferably make oblique angles with the front sides of the respective main portions.

Each clamping portion can have a substantially wedge-shaped cross-sectional outline and includes two surfaces which diverge from a tip of the respective clamping portion counter to the predetermined direction.

Each main portion can be of one piece with the respective clamping portion and with the first section of the nipple. The main portions and the clamping portions of the nipple can be provided with coplanar front surfaces which are remote from the first section of the nipple. The length of the main portions preferably exceeds the length of the respective clamping portions (as seen in the direction of the common axis of the first and second sections of the nipple).

All of the prongs can have identical sizes and shapes.

The nipple can further comprise an internally and/or externally threaded third section which is coaxial with the first section, and a collar (e.g., a hexagonal collar) between the first and third sections of the nipple.

The nut is preferably provided with a substantially concave internal surface which is adjacent the internal thread and serves to deform the prongs in response to movement of the nut toward the collar (and/or vice versa) as a result of rotation of the nipple and the nut relative to each other while the internal thread of the nut mates with the externally threaded first section of the nipple.

The novel features which are considered as characteristic of the invention are set forth in particular in the appended claims. The improved screw coupling itself, however, both as to its construction and the mode of using the same, together with additional features and advantages thereof, will be best understood upon perusal of the following detailed description of certain presently preferred specific embodiments with reference to the accompanying drawings.

DESCRIPTION OF PREFERRED EMBODIMENTS

Figure 1:
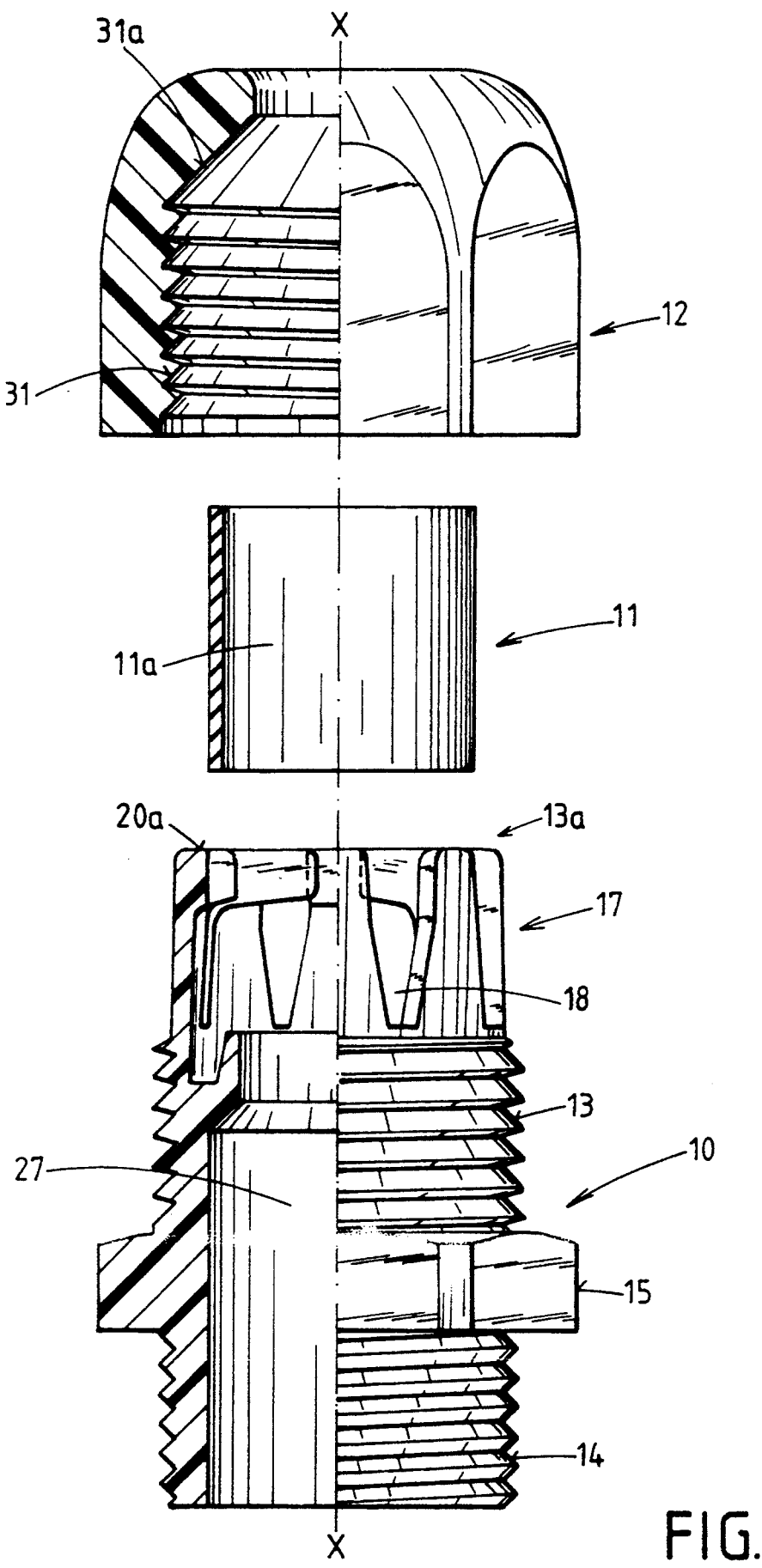
FIG. 1 is an exploded view of a screw coupling which embodies one form of the present invention, the tubular sealing element being shown between the nipple and the nut of the improved coupling and the three components of the coupling being shown in partly elevational and partly axial sectional views.

The screw coupling which is shown in the drawings preferably consists of a suitable plastic material and can be used to sealingly and/or clampingly engage the external surface of a cable, hose, conduit, conductor or the like (not shown). The illustrated coupling is assembled of three components, namely a tubular nipple 10, a tubular sealing element 11 which can be inserted (at least in part) into the nipple to directly contact the external surface of a hose, a cable or the like, and a cap nut 12 which can be brought into mesh with an externally threaded first section 13 of the nipple in order to deform a set of flexible elastic prongs 17 forming part of a second section 13a of the nipple and serving to maintain the element 11 in sealing and/or clamping engagement with a cable, a hose or a like body extending through the axial passage 27 of the nipple 10, through an axial passage 11a of the sealing element 11 and through an axial passage 30 of the nut 12. The nipple 10 further comprises a third section 14 having an external thread which can be used to install the nipple in a wall or the like, not shown.

The plastic material of the nipple 10 can be any one of numerous synthetic plastic substances which are utilized in the electrical industries for the making of electrically insulating parts. The first and third sections 13 and 14 of the nipple 10 are disposed at opposite sides of a polygonal (e.g., hexagonal) collar 15 which can be engaged by a conventional torque transmitting tool in order to drive the section 14 into or to remove this section from a tapped or untapped hole or bore in a wall or another suitable support.

The nut 12 can be made of the same material as the nipple 10 and can also include a polygonal (e.g., hexagonal) portion 28 (see particularly FIG. 2) which can be engaged by a standard tool in order to move the external thread of the section 13 into mesh with the internal thread 31 of the nut or to detach the nut from the section 13. When its internal thread 31 mates with the external thread of the section 13, the nut 10 overlies and confines the set of elastic prongs 17 forming part of the second section 13a of the nipple 10 as well as the tubular sealing element 11 whose material is or can be the same as that of the nipple 10 and/or nut 12 and which is then confined within the second section 13a including the prongs 17. That portion of the external surface of the nut 12 which is remote from the first section 13 (when the latter mates with the internal thread 31) is rounded (as at 29) and its center is traversed by one end of the passage 30 which registers with the passage 27 when the nipple and the nut are connected to each other. The passages 27, 30 and 11a preferably have circular outlines. The dimensions of the polygonal portion 28 of the nut 12 can be the same as those of the collar 15; this ensures that one and the same torque transmitting tool can be used to drive the section 14 into or to withdraw the section 14 from a wall or the like as well as to rotate the nut 12 relative to the nipple 10. The internal thread 31 of the nut 12 and the external thread of the section 13 can be of conventional design; for example, the nut 12 and the section 13 can be provided with complementary threads of the type known as Pg threads. It is also possible to provide the nut 12 and the section 13 with complementary saw teeth, for example, if the parts 10, 12 are to take up substantial axial stresses, i.e., stresses acting substantially in the direction of the common axis X—X of the sections 13, 13a, 14 forming part of the nipple 10.

Figure 2:
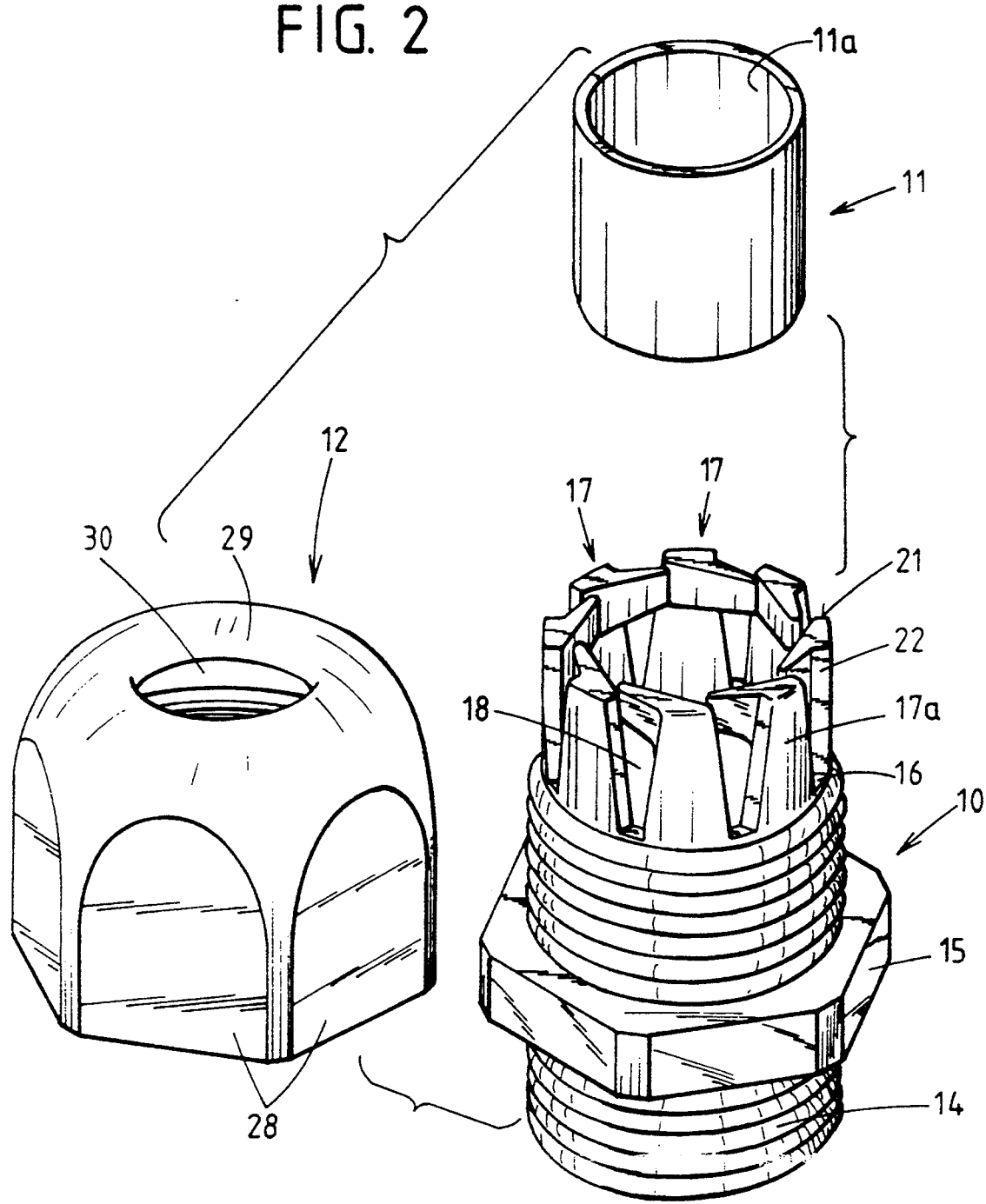
FIG. 2 is a perspective view of the three components of the screw coupling which is shown in FIG. 1.

FIG. 2 shows that the section 13 of the nipple 10 has an end face 16 which is remote from the collar 15 and is adjacent the relatively wide (as measured in the circumferential direction of the section 13) ends of the flexible prongs 17 forming part of the second section 13a. The illustrated second section 13a includes a total of eight prongs 17 having identical sizes and shapes. Neighboring prongs 17 are separated from each other by substantially wedge-like slots 18. Each slot 18 widens in a direction from the end face 16 of the section 13 toward the end face 20a of the section 13a, and the width of each prong 17 increases in the opposite direction, namely from the end face 20a toward the end face 16. As can be readily seen in FIG. 2, each slot 18 resembles a wedge which permits pronounced flexing of the adjacent prongs 17 (and more specifically of the end portions of the prongs at the end face 20a) from the starting or unstressed positions of FIGS. 1, 2 and 3 toward the common axis X—X of the sections 13, 13a and 14 (see FIG. 4).

Each prong 17 includes a relatively short (as seen in the direction of the axis X—X) clamping portion 19 which is adjacent the end face 20a of the section 13a, and a main portion 17a which extends all the way between the end faces 16 and 20a and is of one piece with the respective clamping portion 19. Each of the illustrated clamping portions 19 extends only to one side of the respective main portion 17a, namely in the direction (arrow A in FIG. 3) in which the nut 12 is to be rotated in order to move its internal thread 31 into mesh with the external thread of the section 13 of the nipple 10. Each of FIGS. 1 to 4 shows that each clamping portion 19 overlies (at least in part) the main portion 17a of an adjacent prong 17 in the starting positions of the prongs (and even more so subsequent to flexing of the prongs toward the common axis X—X of the sections 13, 13a and 14 forming part of the nipple 10, see FIG. 4).

Figure 3:
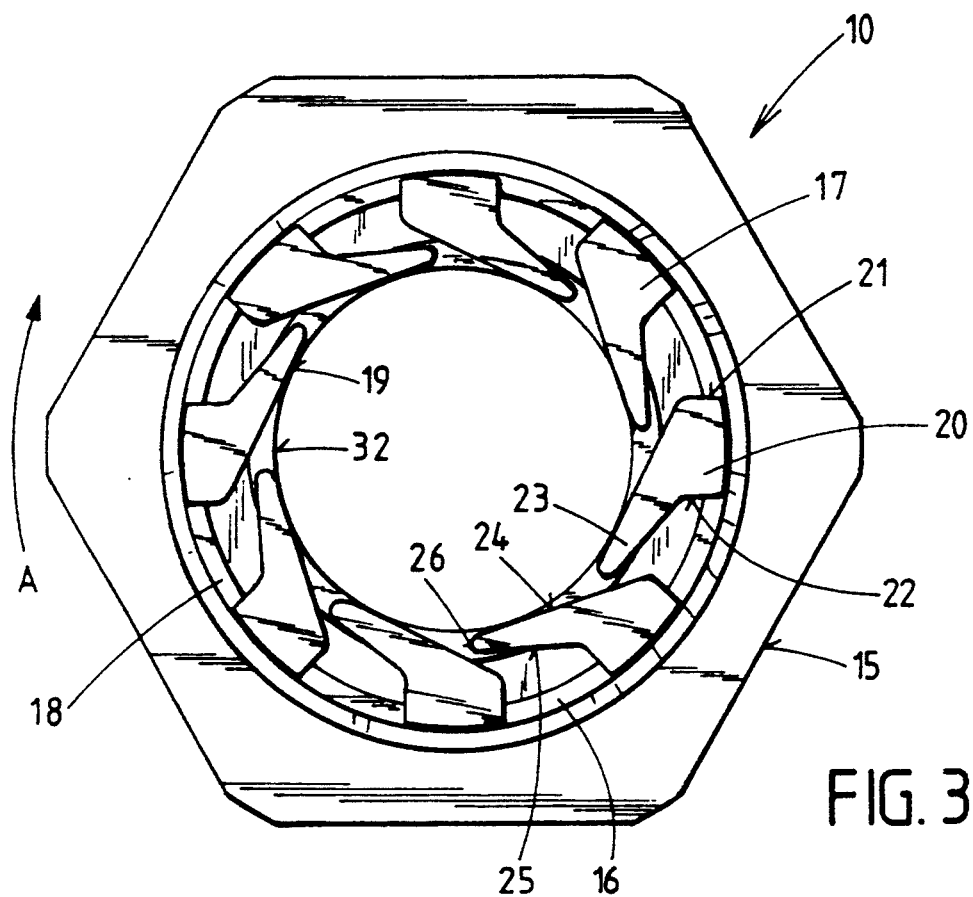
FIG. 3 is a plan view of the nipple with the nut and the sealing element detached so that the prongs are free to assume their starting or undeformed positions.

FIG. 3 shows a circle 32 which is contacted by the internal surfaces 24 of all eight clamping portions 19 when the prongs 17 are permitted to assume their starting or undeformed positions. The center of the circle 32 is or can be located on the axis X—X. FIG. 3 further shows that the front side 22 of each main portion 17a extends rearwardly from the external surface 25 of the respective clamping portion 19, i.e., that each external surface 25 makes with the respective front side 22 an oblique angle (at least while the prongs 17 are free to assume their starting positions).

Figure 4:
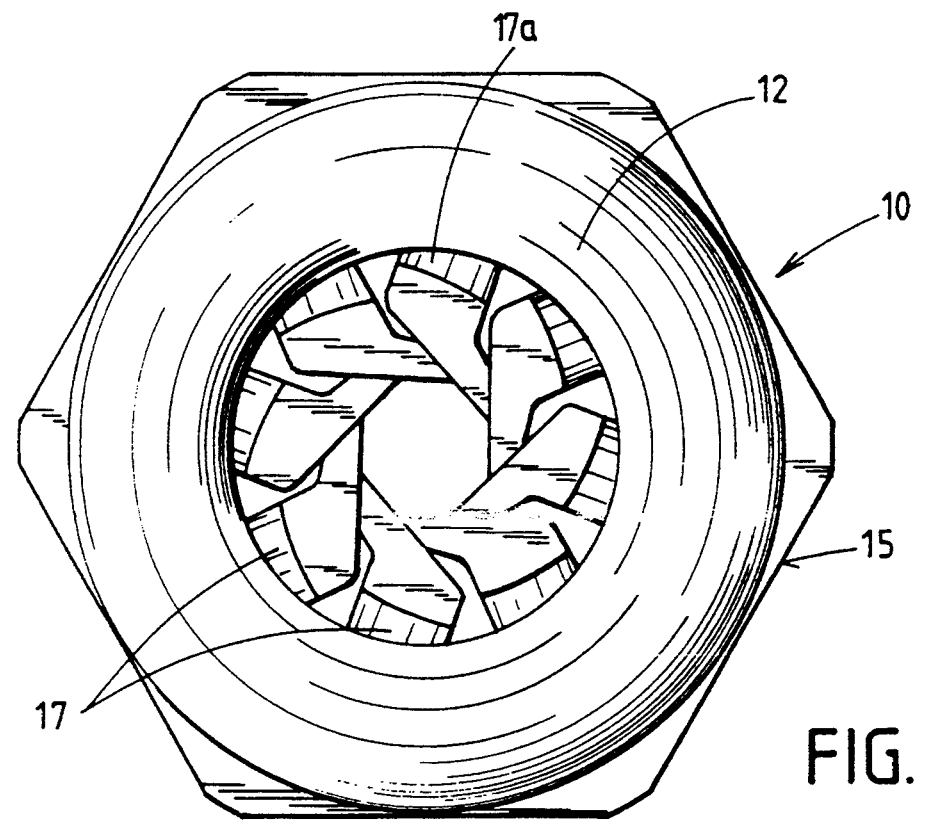
FIG. 4 is a similar plan view but further showing the nut in applied position and the prongs in deformed positions.

FIG. 3 further shows that the internal and external surfaces 24, 25 make an acute angle when the respective prong 17 is free to assume its starting position, i.e., the clamping portions 19 of unstressed prongs 17 resemble wedges and their surfaces 24, 25 diverge from a tip 26 of the respective clamping portion 19 counter to the direction which is indicated by the arrow A. The tip 22 and the adjacent part of each clamping portion 19 overlie an adjacent clamping portion 19, at least when the prongs 17 are caused to be deformed, e.g., in a manner and to the extent as shown in FIG. 4 which shows that the effective cross-sectional area of the passage 27 is greatly reduced in order to ensure that the clamping portions 19 can sealingly and/or clampingly engage a cable, a hose or an analogous object or body having a relatively small outer diameter.

FIGS. 1 to 3 show that the front surface 23 of each clamping portion 19 is coplanar with the front surface 20 of the respective main portion 17a, as well as that all of the front surfaces 20, 23 are located in a common plane, i.e., that the front surfaces 20, 22 together constitute the end face 20a of the section 13a including the prongs 17 and the slots 18.

FIG. 2 shows that each of the illustrated prongs 17 resembles a wedge which tapers in a direction from the end face 16 toward the end face 20a. More specifically, the main portion 17a of each prong 17 resembles a wedge. Each main portion 17a has a rear surface 21 and the aforementioned front surface 22, and the surfaces 21, 22 of each main portion 17a converge toward each other all the way from the end face 16 to the end face 20a. The terms "front" and "rear" are intended to denote the positions of the surfaces 21 and 22 as seen in the direction of arrow A, i.e., in the direction of rotation of the nut 12 in order to move its internal thread 31 into mesh with the external thread of the section 13 forming part of the nipple 10.

As can be seen in each of FIGS. 1 and 2, the length or height of the clamping portions 19 (as measured in the direction of the axis X—X) is less than the length or height of the respective main portions 17a. Thus, the main portions 17a need not contact a hose or a cable which is sealingly engaged by the internal surfaces 24 of the clamping portions 19.

The illustrated cylindrical sealing element 11 can be made of rubber or a plastic material which exhibits similar properties. It is also possible to employ a sealing element in the form of a sheet which is draped around a selected portion of a cable, hose or a like body to be surrounded by the sealing elements 19 when the improved screw coupling is put to use.

As already mentioned before, the clamping portions 19 of non-deformed prongs 17 can assume the positions of FIG. 3 in which their internal surfaces 24 are in substantially linear contact with the external surface of cable or hose (represented by the circle 32). FIG. 4 shows the prongs 17 in deformed condition, namely subsequent to threading of the nut 12 onto the section 13 of the nipple 10 to an extent which is necessary to move the clamping portions 19 toward the axis X—X so that the surfaces 24 can sealingly and/or clampingly engage the adjacent portions of the external surface of a hose, a cable or the like. This entails a more or less pronounced deformation of the tips 26 of clamping portions 19, for example, to the extent as shown in FIG. 4. The tips 26 are not only deformed but they also slide along the internal surfaces 24 of the neighboring clamping portions 19 until the surfaces 24 reach and sealingly and/or clampingly engage the external surface of a body which is to be sealingly engaged and/or clamped by the nipple 10. The free ends of the main portions 17a can also undergo deformation to move nearer to the axis X—X and to thus enable the surfaces 24 of the clamping portions 19 to properly engage the external surface of an object extending through the passages 27, 11a and 30. The sealing element 11 has been omitted in FIG. 4 for the sake of clarity. The free ends of the main portions 17a (namely the ends having the front surfaces 20) are moved radially inwardly by the concave internal surface 31a (see FIG. 1) of the nut 12.

The operation of the improved screw coupling will be readily understood upon perusal of the preceding description. Thus, the nut 12 is caused to mesh with the section 13 when a cable, a hose or another object is introduced into the passages 27, 11a and 30. As the nut 12 rotates in the direction of arrow A and moves axially toward the collar 15, its concave internal surface 31a engages the main portions 17a of the prongs 17 at the end face 20a and causes the clamping portions 19 to move from the positions of FIG. 3 toward the positions of FIG. 4. The clamping portions 19 need not directly engage the external surface of a cable or hose if the sealing element 11 is put to use, i.e., the clamping portions 19 then bear against the external surface of the sealing element 11 and urge the internal surface of such element into sealing and clamping engagement with the external surface of the body which extends through the passages 27, 11a and 30. Experiments with the improved screw coupling indicate that the sealing element 11 or the clamping portions 19 can reliably engage a cable, a hose or a like object in order to furnish a satisfactory sealing action and/or to relieve the object in another way, e.g., by taking up axial stresses. The positions of the clamping portions 19 (upon displacement of such clamping portions toward the axis X—X) automatically conform to the outline of the adjacent portion of the external surface of a cable, a hose or a like object. Furthermore, each of the radially inwardly displaced clamping portions 19 is caused to move into a large surface-to-surface engagement with the sealing element 11 or directly with the external surface of a cable, a hose or the like. The total clamping surface equals the sum of those portions of the eight internal surfaces 24 which are caused to contact the external surface of the sealing element 11 or the external surface of a cable, a hose or the like. The configuration of the slots 18 is or can be selected in such a way that each clamping portion 19 is free to perform a desired movement radially of the nipple 10, i.e., toward the axis X—X. This ensures that the clamping portions 19 can sealingly engage a sealing element 11 or the external surface of a cable, a hose or the like even if the diameter of the external surface of such object is much less than the diameter of the passage 30. The clamping portions 19 cannot interfere with radially inward movements of the free ends of the main portions 17a because each such clamping element extends only to one side of the respective main portion 17a.

An important advantage of the improved screw coupling is that it embodies all features of the screw coupling which is disclosed in U.S. Pat. No. 4,787,657 to Henniger while also embodying a number of advantages which cannot be achieved with the patented screw coupling. For example, the wedge-shaped slots 18 constitute an improvement over the slots in the coupling of Henniger. The same applies for the clamping portions 19 of the improved coupling; such clamping portions ensure the establishment of a more satisfactory clamping and/or sealing action. Each prong 17 of the improved coupling is provided with a clamping portion 19, and the configuration and/or orientation of the clamping portions 19 is different from the configuration and/or orientation of clamping portions which are utilized in the screw coupling of Henniger. As already mentioned above, experiments with the improved coupling indicate that the sealing and/or clamping action is much more satisfactory than that which is achievable with heretofore known screw couplings for the sealing and/or clamping of hoses, cables, pipes, conductors, conduits and/or like bodies.

Another important advantage of the improved screw coupling is that all of the clamping elements 19 extend in the same direction, namely in the direction (arrow A) of rotation of the nut 12 in order to move its internal threads 31 into mesh with the external threads of the section 13. Again, experiments with the improved coupling indicate that the sealing and/or clamping action of the improved coupling is much more satisfactory than that of a coupling with prongs having clamping portions extending counter to the direction of rotation of the nut.

The feature that the internal surfaces 24 of the clamping portions 19 contact a circle 32 in undeformed condition of the prongs 17 is desirable and advantageous because this ensures the establishment of large-area sealing contact with the element 11 or with the external surface of a cable, a hose or the like.

The feature that the external surfaces 25 of the clamping portions 19 make oblique angles with the front sides 22 of the respective main portions 17a is desirable and advantageous because such orientation of the surfaces 22, 25 ensures that (at least under certain circumstances) the external surfaces 22 can serve as abutments or stops for the adjacent portions of the neighboring prongs 17. Such situation can develop if the effective cross-sectional area of the passage 27 is to be reduced beyond that which is shown in FIG. 4, i.e., if the nut 12 is to be called upon to greatly reduce the cross-sectional area of that portion of the passage 27 which is surrounded by the clamping portions 19.

The tips 26 of the clamping portions 19 may but need not actually contact the neighboring prongs 17 when the prongs are free to relax, i.e., to assume the starting positions of FIG. 3.

The length of the clamping portions 19 in the axial direction of the nipple 10 can be selected practically at will, depending on the preferences of the purchasers. For example, the length of each clamping portion 19 in the direction of the arrow X—X can be between one-third and one-fourth of the length of a main portion 17a. Alternatively, the length of a main portion 17a can match the length of the respective clamping portion 19 plus between one-third or one-fourth of the clamping portion.

It is further possible to provide the nipple 10 with two or more sets of different prongs. The provision of a single set of identical prongs is preferred for the reasons of economy as well as because the screw coupling can furnish a more predictable clamping and/or sealing action if it employs a single set of identical prongs 17.

The improved screw coupling is susceptible of numerous additional modifications without departing from the spirit of the invention. For example, the shape and/or the dimensions of the main portions 17a and/or of the clamping portions 19 can be altered in a number of ways. Furthermore, the number of prongs 17 can be reduced to less than eight or increased to nine or more. Moreover, the length of the clamping portions 19 in the direction of the axis X—X can be increased or reduced, the configuration of the nut 12 can be altered, and the coupling can be furnished with or without a sealing element 11 or with a set of different sealing elements.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A screw coupling, particularly for surrounding cables, hoses, conduits, conductors and like bodies, comprising a substantially tubular nipple including an externally threaded first annular section and a second annular section attached to and coaxial with said first section, said second section including a plurality of neighboring identiacal flexible prongs extending in substantial parallelism with the common axis of said sections and being separated from each other by slots of said second section, said prongs having a width which decreases from said first section toward an end of said second section distal said first section, as viewed in the direction of the common axis of said first and second sections, and said slots having a width which increases from said first section toward the distal end of said second section; and a nut having an internal thread movable into mesh with the external threads of said first section in response to rotation of said nut in a predetermined direction to thereby deform at least a portion of each of said prongs from a starting position toward said common axis, said prongs having clamping portions extending circumferentially only in said direction and the clamping portions of neighboring prongs at least partially overlying said neighboring prongs in said starting positions of the prongs.

2. The coupling of claim 1, wherein at least one of said nipple and said nut contains a plastic material.

3. The coupling of claim 1, further comprising a substantially tubular sealing element insertable into said second section and deformable by said prongs in response to rotation of said nut while said internal thread mates with said first section.

4. The coupling of claim 1, wherein each of said prongs further includes a main portion extending in substantial parallelism with said common axis in the starting position of the respective prongs, said clamping portions being of one piece with and extending from the respective main portions substantially circumferentially of said nut at locations remote from said first section.

5. The coupling of claim 1, wherein said prongs further comprise main portions extending in substantial parallelism with said common axis, at least in the starting positions of the respective prongs, said clamping portions extending from the respective main portions in said predetermined direction.

6. The coupling of claim 1, wherein said clamping portions have internal surfaces confronting said common axis and forming a common circle in the starting positions of said prongs.

7. The coupling of claim 1, wherein each of said prongs further comprises a main portion, and said clamping portions are attached to and extend from the respective main portions in said predetermined direction, each of said clamping portions overlying the main portion of a neighboring prong at least in the starting portions of said prongs.

8. The coupling of claim 7, wherein said clamping portions have external surfaces facing away from said common axis, wherein said external surfaces extend rearwardly to form a front side of said main portion, each external surface making an oblique angle with the front side of the respective main portion.

9. The coupling of claim 1, wherein each of said prongs further comprises a main portion of one piece with said first section and with the respective clamping portion, said main portions and said clamping portions having coplanar front surfaces remote from said first section.

10. The coupling of claim 1, wherein each of said prongs further comprises a main portion connecting said first section with the respective clamping portion, said clamping portions having a first length and said main portions having a greater second length, as seen in the direction of said common axis.

11. The coupling of claim 1, wherein said nipple further comprises a threaded third section coaxial with said first section, and a collar between said first and third sections.

12. The coupling of claim 11, wherein said nut further comprises a substantially conical internal surface adjacent said internal thread and arranged to deform said prongs in response to movement of said nut toward said collar as a result of rotation of said nipple and said nut relative to each other while said internal thread mates with said externally threaded first portion of said nipple.

13. The coupling of claim 1, wherein each of said clamping portions includes a tip from which two surfaces diverge in a direction counter to said predetermined direction, and wherein said tip and said surfaces, when viewed in transverse cross-section along said common axis, form a substantially wedge-like shape.

* * * * *